United States Patent [19]

Moir

[11] Patent Number: 4,985,792
[45] Date of Patent: Jan. 15, 1991

[54] DISK DRIVE SPINDLE MOTOR WITH EXTERNALLY MOUNTED FLUX CONCENTRATOR RING

[75] Inventor: Michael B. Moir, Newbury Park, Calif.

[73] Assignee: Seagate Technology, Inc., Scotts Valley, Calif.

[21] Appl. No.: 319,527

[22] Filed: Mar. 6, 1989

[51] Int. Cl.⁵ .................. G11B 17/02; G11B 17/04
[52] U.S. Cl. .................. 360/99.08; 360/98.07; 360/97.01
[58] Field of Search ............... 360/97.01, 98.01, 98.07, 360/99.04, 99.08, 99.11, 97.02, 98.02; 310/67 R, 71, 152

[56] References Cited

U.S. PATENT DOCUMENTS

| | | | |
|---|---|---|---|
| 4,658,312 | 4/1987 | Elsasser et al. | 360/99.08 |
| 4,701,653 | 10/1987 | Merkle et al. | 360/99.08 X |
| 4,818,907 | 4/1989 | Shirotori | 360/99.08 X |
| 4,843,500 | 6/1989 | Elsasser et al. | 360/99.11 |
| 4,858,044 | 8/1989 | Crapo | 360/99.08 |

Primary Examiner—Robert S. Tupper
Assistant Examiner—Andrew L. Sniezek
Attorney, Agent, or Firm—Kelly, Bauersfeld & Lowry

[57] ABSTRACT

A disk drive spindle motor includes an improved mounting arrangement for Hall sensors and an associated flux concentrator ring. The spindle motor comprises a compact dc motor having a driven rotor hub adapted to support one or more computer disks within a substantially sealed disk drive housing. A timing magnet is mounted at one axial end of the rotor hub in close proximity with Hall sensors seated within individual sensor ports and electrically connected directly to appropriate conductors on the exterior of the housing. The Hall sensors are supported by a flux concentrator ring which is mounted against the housing exterior to overlie and close the sensor ports, and further to concentrate the magnetic flux path through the Hall sensors. Such concentration of the flux path substantially isolates the timing magnet from the computer disks.

16 Claims, 2 Drawing Sheets

DISK DRIVE SPINDLE MOTOR WITH EXTERNALLY MOUNTED FLUX CONCENTRATOR RING

BACKGROUND OF THE INVENTION

This invention relates to improvements in spindle motors for rotatably supporting and driving one or more memory storage disks in computer disk drives. More particularly, this invention relates to an improved disk drive spindle motor having a compact arrangement for mounting Hall sensors used in motor timing and directional control, while substantially isolating computer disks from changing magnetic fields associated with the Hall sensors.

Disk drive units in general are known in the art for use in modern microcomputers such as personal and desk top computers and the like. In one popular form, such disk drive units comprise a so-called Winchester drive having one or more memory storage disks supported in a stack by a compact spindle motor within a substantially sealed disk drive housing. The spindle motor rotatably drives the disks in close proximity with one or more electromagnetic transducers which are appropriately controlled to read or write data on prepared disk surfaces. Such disk drive units, sometimes refer to as "hard" or "fixed" disks, are normally available as a compact package with the sealed housing assembled on a rigid chassis together with a circuit board carrying the requisite drive electronics to interface with other components of a computer system.

In one common form, spindle motors for disk drive units have comprised small dc motors designed for rapid disk acceleration to a substantially constant operating speed, typically about 3,600 rpm. Such motors commonly include solid state commutation components such as Hall sensors mounted in close association with a timing magnet which rotates with the computer disks. In operation, the Hall sensors respond to changing magnetic fields attributable to the timing magnet to generate control pulses used to regulate spindle motor direction and speed. For efficient operation, these changing magnetic fields must have a minimum strength to insure reliable triggering of the Hall sensors. However, the field strength normally decreases in response to increased operating temperatures. Accordingly, to insure accurate triggering of the sensors throughout a normal range of operating temperatures, a relatively high strength or high energy timing magnet is required. Unfortunately, the use of a high energy timing magnet can result in stray magnetic flux which can adversely affect data storage or retrieval on one or more of the computer disks, particularly at inner tracks on the disks. This data interference problem can be particularly significant in modern "micro" disk drives of the type used in personal or lap top computers, such as so-called 3.5 inch disk drives and the like.

The object of the present invention is to provide an improved spindle motor for a computer disk drive, wherein the spindle motor has an improved yet highly compact mounting arrangement for Hall sensors in association with a relatively high energy timing magnet, while substantially isolating computer disks from the magnet flux field associated with the timing magnet.

SUMMARY OF THE INVENTION

In accordance with the invention, an improved disk drive spindle motor is provided for rotatably supporting and driving one or more computer memory storage disks within a substantially sealed disk drive housing. The spindle motor includes an improved mounting arrangement for a plurality of Hall sensors used to generate timing pulses for motor direction and speed control. In addition, the spindle motor incorporates an externally mounted flux concentrator ring for substantially isolating magnetic fields associated with the Hall sensors from the computer disks.

In one preferred form, the spindle motor comprises drive means for dc rotatably driving a rotor hub. The rotor hub supports and thus rotates one or more computer memory storage disks in close association with appropriate transducers for purposes of reading and/or writing data. A timing magnet such as a multipole ring magnet is also carried at one axial end of the rotor hub for rotation therewith in relatively close clearance with the disk drive housing.

The Hall sensors are mounted within individual sensor ports formed in the disk drive housing, and disposed in close association with the timing magnet. The Hall sensors are supported in a manner permitting direct electrical connection to appropriate conductors at the exterior of the housing. In the preferred form, the Hall sensors are supported by the flux concentrator ring which is formed from magnetic steel or the like and is mounted against the housing exterior to substantially overlie and close the sensor ports. Importantly, the flux concentrator ring confines or focuses the magnet flux fields of the timing magnet for passage through the Hall sensors, thereby insuring reliable sensor triggering and further substantially isolating the magnetic flux fields from the computer disks. With this construction, a relatively high energy timing magnet can be used to insure sensor triggering throughout a normal operating temperature range, substantially without effecting data storage and retrieval on the disks.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
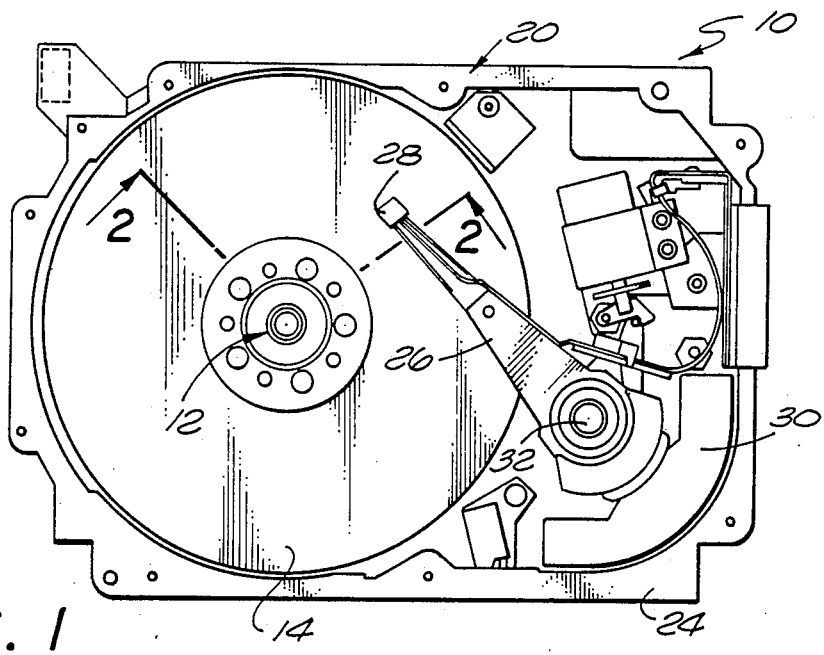
FIG. 1 is a top plan view depicting an exemplary disk drive unit incorporating a spindle motor embodying the novel features of the invention.
Figure 2:
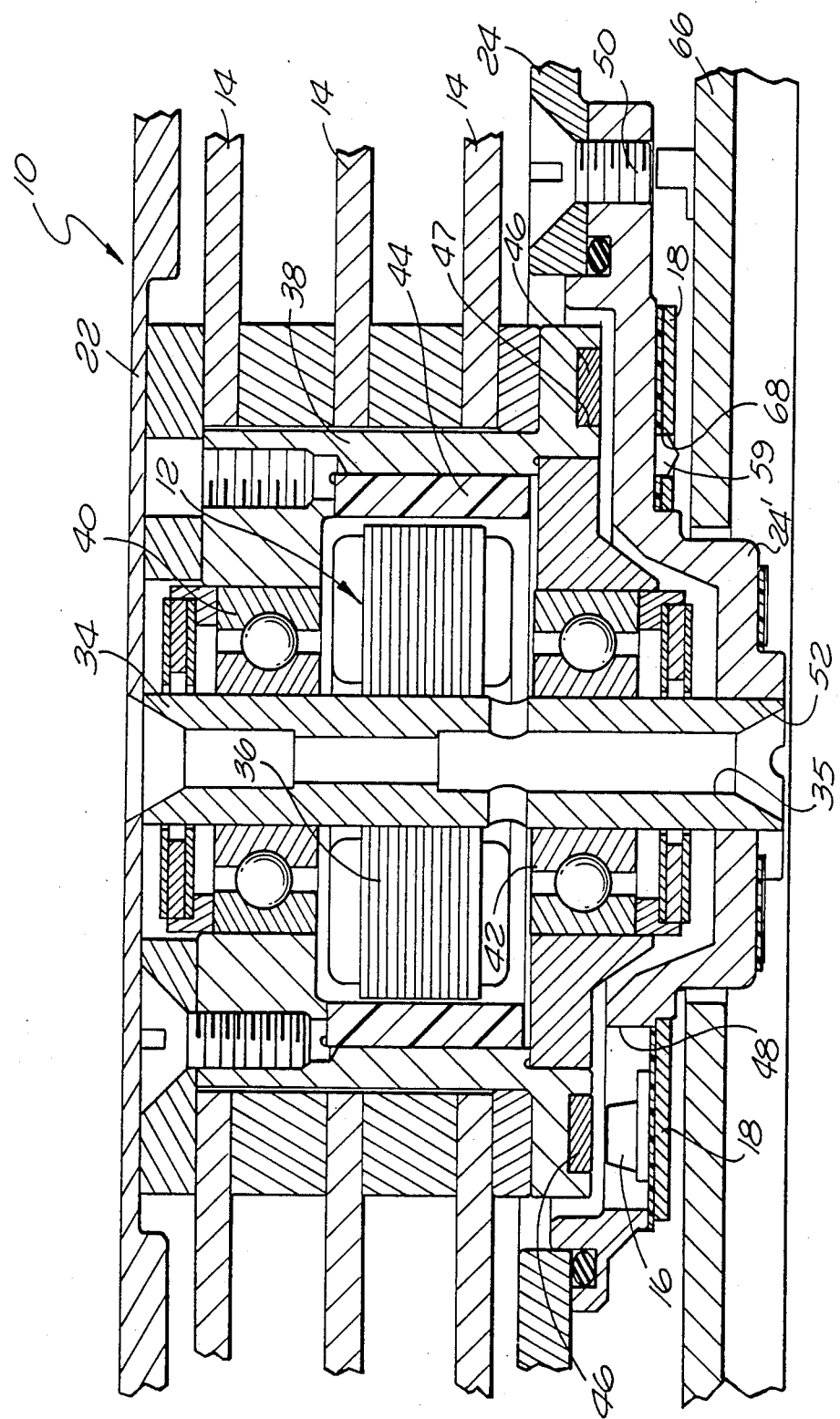
FIG. 2 is an enlarged fragmented vertical sectional view taken generally on the line 2—2 of FIG. 1.

As shown in the exemplary drawings, a disk drive unit referred to generally in FIG. 1 and 2 by the reference numeral 10 includes an improved spindle motor 12 for rotatably supporting and driving one or more computer memory storage disks 14. The spindle motor 12 includes an improved mounting arrangement for a plurality of Hall sensors 16 (FIG. 2) which, in combination with an externally mounted flux concentrator ring 18, provide accurate and efficient regulation of motor direction and speed.

As shown generally in FIGS. 1 and 2, the disk drive unit 10 comprises a so-called "hard" or "fixed" disk drive of the general type used in modern personal computers and the like. The disk drive unit 10 conventionally includes a substantially sealed housing 20 defined by upper and lower interconnected, generally shell-shaped housing members 22 and 24 formed typically from aluminum or the like, with the upper housing member 22 being removed in FIG. 1 to permit viewing of internal disk drive components. The sealed housing 20 has an overall size and shape with generally standardized external dimensions to fit within a limited installation envelope within the cabinet (not shown) of a central processor unit for a computer. In this regard, the disk drive unit 10 incorporating the improved spindle motor 12 of the present invention is particularly designed for use in downsized disk drive applications, such as a compact disk drive unit of the so-called 3.5 inch disk size.

The illustrative disk drive unit 10 includes a plurality of the computer memory storage disks 14 mounted in a stacked array for rotational driving by the spindle motor 12, as will be described. While three of the computer disks 14 are shown in FIG. 2 by way of example, it will be understood that the specific number of disks may vary according to the overall size and design of the disk drive unit. As is known in the art, a head positioned assembly 26 is mounted within the sealed housing 20 alongside the disk stack and includes a plurality of electromagnetic heads 28 disposed respectively in the close proximity with upper and lower surfaces of the disks 14. A suitable actuator motor 30, such as a movable coil dc motor, is regulated by a controller (not shown) to pivot the head positioner assembly 26 on a bearing 32 for purposes of displacing the heads 28 through generally radial traverses relative to the disk surfaces for purposes of storing and/or retrieving data, all in a well known manner. For a further description of the general construction and operation of the illustrative disk drive unit, see copending U.S. Ser. No. 173,619, filed Mar. 25, 1988, and entitled DISK DRIVE SPINDLE MOTOR, now U.S. Pat. No. 4,905,110, which is incorporated by reference herein.

The improved spindle motor 12 of the present invention has an overall construction similar to the spindle motor described in the above-referenced U.S. Ser. No. 173,619. However, the improved spindle motor 12 incorporates a highly compact and operationally efficient mounting arrangement for commutation components including the Hall sensors 16 and associated means for subjecting the Hall sensors to changing magnetic fields to insure accurate and reliable triggering of control pulses for direction and speed control. Importantly, this improved mounting arrangement includes the flux concentrator ring 18 which focuses the magnetic fields through the Hall sensors for reliable triggering. Moreover, the flux concentrator ring 18 provides a flux shield which substantially isolates the focused magnetic fields from the data surfaces on the computer disks 14. Accordingly, as will be described, relatively high strength fields can be used to trigger the Hall sensors, substantially without interfering with data storage or retrieval particularly at tracks located near the spindle motor. This arrangement advantageously expands the surface area on the disks which can be occupied by data tracks, thereby expanding disk storage capacity.

As shown in FIG. 2, the spindle motor 12 comprises a stator shaft 34 secured between the upper and lower housing members 22 and 24 within the disk drive housing 20. The stator shaft supports a stationary armature 36 which includes appropriate windings for conventional multiphase operation. The armature windings are electrically connected to an appropriate power supply, as will be described, by conductors (not shown) passing through a hollow bore 35 in the stator shaft 34 to the underside of the disk drive housing 20.

The spindle motor 12 further includes a rotor hub 38 supported by bearings 40 and 42 for relatively high speed rotation about the armature 36 coaxially with the stator shaft 34. The rotor hub 38 includes suitable means for supporting the plurality of computer disks in spaced, stacked relation for rotation as a group within the disk drive housing. In addition, the rotor hub 38 carries a permanent magnet sleeve 44 which may be press-fit or otherwise suitably secured therein in relatively close running clearance with the armature 36. This permanent magnet sleeve 44 defines a circumferentially arranged plurality of alternating poles, preferably chosen in number for numerical mismatch with the number of armature poles. When electrical power is supplied to the armature, under appropriate control as is known in the art, the resultant flux coupling between the armature 36 and the magnet 40 rotationally drives the magnet 44 together with the rotor hub 38 and the computer disks 14 carried thereby. To this point, the construction and operation of the spindle motor 12 corresponds with the spindle motor described in copending Ser. No. 173,619.

Figure 6:
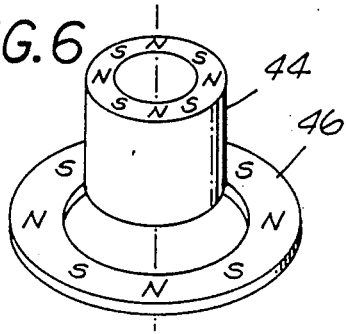
FIG. 6 is an exploded perspective view illustrating a multihole permanent magnet rotor sleeve in aligned relation with a multipole timing magnet for use in the invention.

The Hall sensors 16 provide the control pulses as a function of changing motor phases during rotation to regulate power supplied to the armature 36. In this regard, the Hall sensors 16 are positioned in close proximity with a timing magnet 46 (FIG. 2) carried at the axially lower end of the rotor hub 38 for rotation therewith. FIG. 2 shows one preferred mounting arrangement with the timing magnet 46 seated within a shallow annular recess 47 at the axially lower end of the rotor hub. This timing magnet 46 includes a circumferentially arranged plurality of alternate poles which correspond in number and are generally aligned with the poles of the permanent magnet 44, as viewed in FIG. 6. As the rotor hub 38 rotates during spindle motor operation, the Hall sensors 16 are exposed to changing magnetic fields which trigger the control pulses used to control commutation in a permanent magnetic dc motor. A further discussion of Hall sensor operation to control motor commutation is found in C.G. Vienott, *Fractional—& Subfractional—Horsepower Electric Motors*, pgs. 282–283 (3d ed. 1970), which is incorporated by reference herein.

Figure 3:
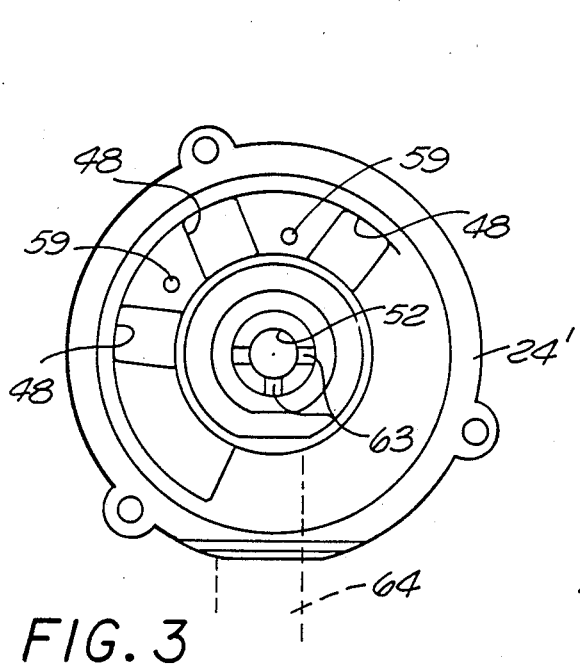
FIG. 3 is a bottom plan view depicting a housing cap forming a portion of a substantially sealed disk drive housing.
Figure 5:
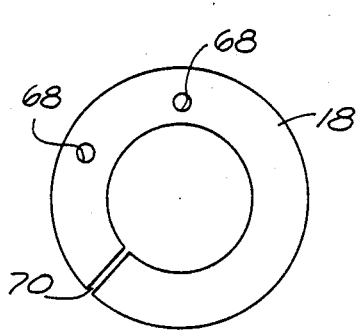
FIG. 5 is a plan view depicting a flux concentrator ring for mounting onto the housing cap.

In accordance with a primary aspect of the invention, to achieve an easily assembled and highly compact motor geometry, the Hall sensors 16 are installed from the exterior of the housing 20 within individual sensor ports 48 formed in the housing. More particularly, as shown in FIG. 3 the sensor ports 48 are formed in a lower housing cap 24' adapted for connection by screws 50 or the like to the lower housing member 24, with the cap 24' further including a central passage 52 for seated reception of the lower end of the stator shaft 34. For normal three phase motor operation, three of the sensor ports 48 are provided at appropriate intervals about the central passage 52.

Figure 4:
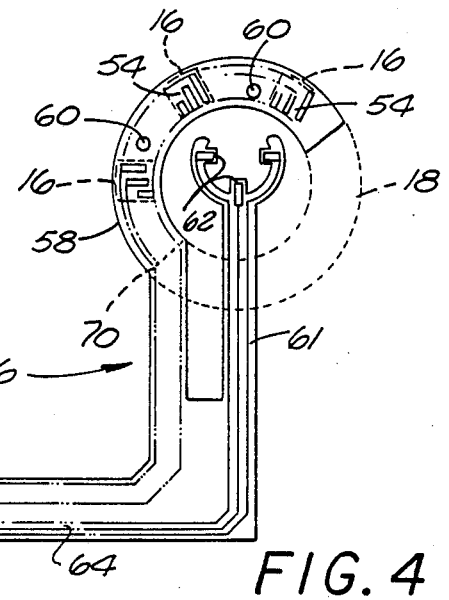
FIG. 4 is a plan view depicting a flex cable for connection to the spindle motor.

The Hall sensors 16 are conveniently coupled directly to conductors located externally with respect to the disk drive housing 20. In this regard, in the preferred form of the invention, the Hall sensors 16 are individually mounted onto preformed pads 54 of a shaped flex cable 56, as viewed in FIG. 4. This flex cable 56 includes a generally semicircular leg 58 having the sensor pads 54 formed thereon and shaped to overlie the three sensor ports 48 in the housing cap 24'. One or more short alignment pegs 59 project downwardly from the housing cap 24' to seat within preformed holes 60 in the flex cable 56 to insure accurate Hall sensor alignment with the timing magnet 46.

The preferred flex cable 56 further includes a second leg 61 with a plurality of tabs 62 adapted to register with notches 63 adjacent the central passage 52 in the housing cap 24' for facilitated connection to armature conductors (not shown). The two legs of the flex cable 56 conveniently join in a common cable base 64 adapted to carry a suitable multiprong fitting 65 or the like for easy plug-in connection to associated drive electronics on a circuit board 66 (FIG. 2). In this regard, such plug-in connection of the flex cable to the drive electronics is described in one preferred form in copending application Ser. No. 272,450, filed Nov. 17, 1988, and entitled SPINDLE MOTOR FLEX CABLE, now U.S. Pat. No. 4,923,406, which is incorporated by reference herein.

The flux concentrator ring 18 is assembled with the flex cable 56 and the Hall sensors 16 to concentrate the magnetic flux paths through the Hall sensors, and to isolate the computer disks 14 for those magnetic paths. Some particularly, the flux concentrator ring 18 is formed from magnetic steel or other flux carrying material and is mounted externally on the housing cap 24' in a position directly overlying the Hall sensors 16. Small preformed holes 68 in the ring 18 conveniently assist in seating and aligning the ring in a position substantially closing the sensor ports 48. A radially extending gap 70 in the ring 18 permits the semicircular portion of the flex cable leg 58 to extend from the circuit board 66 to a position sandwiched by the ring 18 against the housing cap.

During spindle motor operation, the timing magnet 46 rotates with the rotor hub 38 directly over the trio of Hall sensors 16. The Hall sensors respond, as previously described, by triggering control pulses used to regulate motor operation. Importantly, these triggering events occur reliably and efficiently due to the flux concentrator ring 18 which concentrates or focuses the magnetic flux paths directly through the sensors. As a result, the flux concentrator ring 18 also confines the flux paths in substantial isolation with respect to the computer disks to avoid interference with disk data, particularly with respect to inner tracks on the lowermost disk. This arrangement beneficially permits a relatively high strength or high energy timing magnet which produces strong magnetic fields for reliable and efficient sensor triggering, without significant stray flux affecting the data disks. For example, in one working embodiment, an 8 megagauss timing magnet was used to provide strong field strengths through varying normal operating temperature, without significantly affecting data storage and retrieval.

The above-described mounting arrangement is conveniently assembled by affixing the flux concentrator ring 18 to the legs of the flex cable 56 with pressure sensitive adhesive or the like. With this subassembly, the ring 18 provides a convenient rigid substrate to facilitate attachment of the Hall sensors 16 to the flex cable by soldering or the like. The unit is then secured quickly and easily onto the housing cap 24' in the appropriate position by means of an adhesive. The particular adhesive, such as U.V. curable adhesive, is selected to insure sealing of the sensor ports 48 so that the disk drive housing 20 will be substantially sealed when finally assembled. Additional adhesive may be applied into the ports 48 from the interior of the housing cap 24' to insure this sealing function. The housing cap 24' is affixed to the lower housing member 22, and the various components of the disk drive are assembled therein.

The improved spindle motor 12 of the present invention thus provides a highly compact geometry with high strength magnetic fields applied to the Hall sensors 16. These high strength fields insure reliable sensor triggering throughout normal operation, with the external flux concentrator ring isolating the fields from the computer disks.

A variety of modifications and improvements to the improved spindle motor will be apparent to those skilled in the art. Accordingly, no limitation on the invention is intended by way of the foregoing description or the accompanying drawings, except as set forth in the appended claims.

What is claimed is:

1. A disk drive spindle motor for use in a disk drive unit having at least one computer disk within a disk drive housing, said spindle motor comprising:

rotor means for rotatably supporting the at least one computer disk within the housing;

drive means for rotatably driving said rotor means;

a timing magnet carried by said rotor means for rotation therewith, said timing magnet being positioned generally at one axial end of said rotor means in relatively close running clearance with the housing;

a plurality of Hall sensors mounted within sensor ports formed in he housing and in relatively close proximity with said timing magnet, said Hall sensors responding to moving magnetic fields associated with rotation of said timing magnet to control spindle motor commutation; and a flux concentrator ring mounted on the exterior of the housing to substantially overlie and close the sensor ports, said flux concentrator ring focusing the moving magnetic fields associated with rotation of said timing magnet for passage through said Hall sensors.

2. The spindle motor of claim 1 further including a flex cable having at least a portion thereof sandwiched between said ring and the exterior of the housing, said flex cable having conductors for direct connection to the Hall sensors.

3. The spindle motor of claim 1 wherein said drive means comprises a stator shaft and an armature carried by said stator shaft, and wherein said rotor means includes a multipole permanent magnet, said timing magnet comprising a multiple pole ring magnet having a number of poles corresponding in numbers and generally aligned with the poles of said permanent magnet.

4. A disk drive spindle motor for use in a disk drive unit having at least one computer disk within a disk drive housing, said spindle motor comprising:
   rotor means for rotatably supporting the at least one computer disk within the housing;
   drive means for rotatably driving said rotor means;
   a timing magnet carried by said rotor means for rotation therewith, said timing magnet being positioned generally at one axial end of said rotor means in relatively close running clearance with the housing;
   a plurality of Hall sensors mounted within sensor ports formed in the housing and in relatively close proximity with said timing magnet, said Hall sensors responding to moving magnetic fields associated with rotation of said timing magnet to control spindle motor commutation; and
   a flux concentrator ring mounted on the exterior of the housing to substantially overlie and close the sensor ports, said flux concentrator ring focusing the moving magnetic fields associated with rotation of said timing magnet for passage through said Hall sensors;
   said Hall sensors being mounted on and supported by said flux concentrator ring.

5. The spindle motor of claim 4 wherein said flux concentrator ring and the housing include registration means for aligning the Hall sensors within the sensor ports when said flux concentrator ring is mounted on the housing.

6. A disk drive spindle motor in combination with a disk drive housing, comprising:
   rotor means for rotatably supporting at least one computer disk within said housing;
   drive means for rotatably driving said rotor means;
   a timing magnet carried by said rotor means for rotation therewith, said timing magnet being positioned generally at one axial end of said rotor means in relatively close running clearance with said housing;
   said housing defining at least one sensor port formed therein in general alignment with said timing magnet;
   timing control means mounted within said at least one sensor port in relatively close proximity with said timing magnet, said timing control means including means for responding to moving magnetic fields associated with rotation of said timing magnet to control spindle motor commutation; and
   a flux concentrator ring mounted on the exterior of said housing to substantially overlie and close said at least one sensor port, said flux concentrator ring focusing the moving magnetic fields associated with said timing magnet for passage through said timing control means.

7. The combination of claim 6 wherein said timing control means comprises a plurality of Hall sensors.

8. The combination of claim 7 wherein said at least one sensor port comprises a plurality of sensor ports for individual mounting therein of said Hall sensors.

9. The combination of claim 4 further including conductor means connected from the exterior of said housing directly to said timing control means.

10. The combination of claim 9 wherein said conductor means comprises a flex cable, and further including said flux concentrator ring mounted against the exterior of said housing with a portion of said flex cable sandwiched between said ring and said housing.

11. A disk drive unit, comprising:
    a disk drive housing;
    a spindle motor mounted within said housing and including a rotor hub and means for rotatably driving said rotor hub;
    at least one computer disk carried by said rotor hub;
    a timing magnet carried generally at one axial end of said rotor hub for rotation therewith:
    said housing having a plurality of sensor ports formed therein in general alignment with said timing magnet;
    a plurality of timing control devices positioned respectively within said sensor ports, said timing control devices including means for responding to moving magnetic fields associated with rotation of said timing magnet to control spindle motor commutation;
    conductor means for electrical connection directly to said timing control devices from the exterior of said housing; and
    a flux concentrator ring mounted on the exterior of said housing and substantially closing said sensor ports from the exterior of said housing, said timing control devices focusing the moving magnetic fields associated with said timing magnet for passage through said timing control devices.

12. The disk drive unit of claim 11 wherein said driving means comprises a stator shaft and an armature carried by said stator shaft, and wherein said rotor hub carries a multipole permanent magnet in driven relation with said armature, said timing magnet comprising a multiple pole ring magnet having a number of poles corresponding and generally aligned with the poles of said permanent magnet.

13. The disk drive unit of claim 12 wherein said timing control devices are supported by said flux concentration ring, and further including registration means for aligning said flux concentration ring relative to said housing with said timing control devices positioned within said sensor ports.

14. The disk drive unit of claim 13 wherein said conductor means comprises a flex cable, at least a portion of said flex cable being sandwiched between said flex concentrator ring and said housing.

15. The disk drive unit of claim 14 wherein said flex concentrator ring has a radial gap therein for passage of said cable.

16. The disk drive unit of claim 11 including an adhesive for mounting said flux concentrator ring onto the exterior of said housing.

* * * * *